June 1, 1943.  A. F. SURRÉ  2,320,760
IMAGE PRODUCING APPARATUS
Filed Jan. 12, 1940
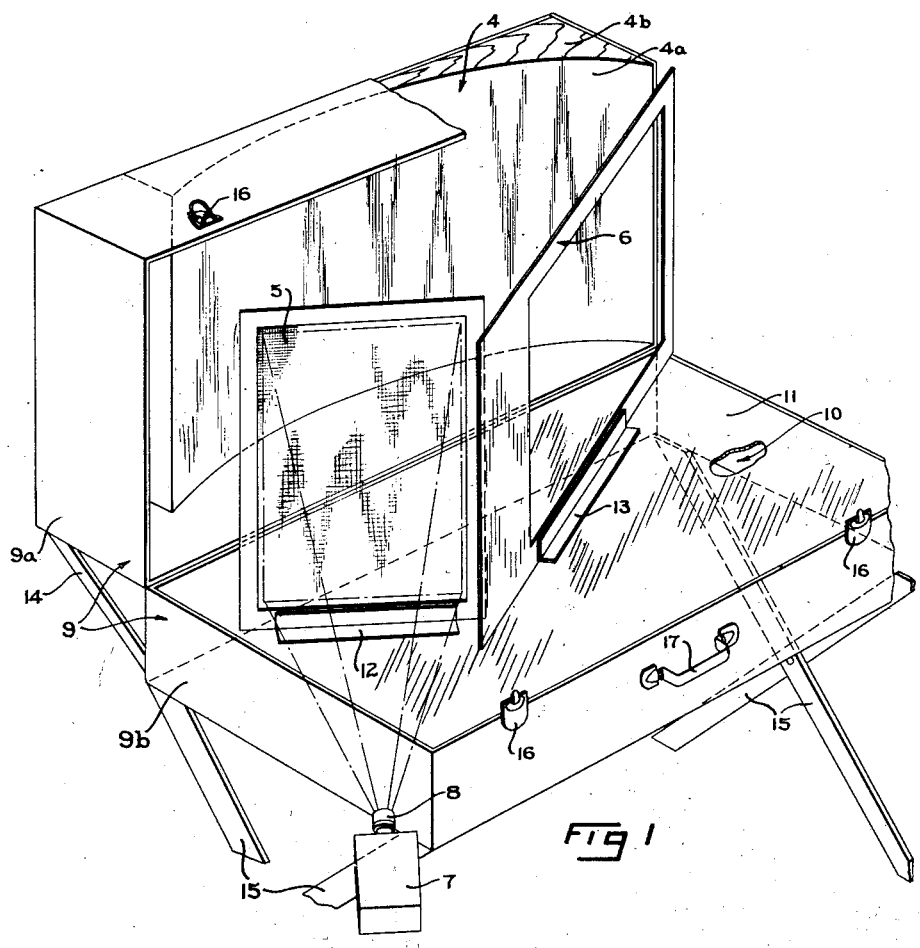
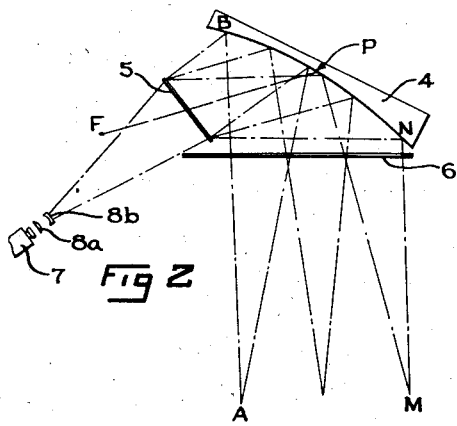
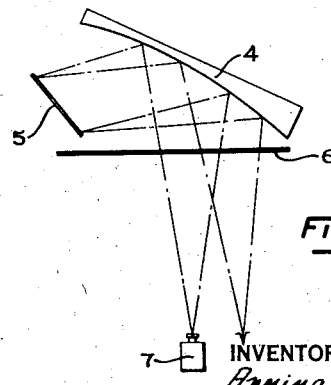
INVENTOR
Anning F. Surré
BY
F. Bascom Smith
ATTORNEY Patented June 1, 1943

2,320,760

UNITED STATES PATENT OFFICE 2,320,760

IMAGE PRODUCING APPARATUS

Anning F. Surré, Woodcliff, N. J., assignor to Mendez Corporation, New York, N. Y., a corporation of Delaware Application July 12, 1940, Serial No. 345,050

3 Claims. (Cl. 88—16.6)

This invention relates to apparatus for making a picture or image visible to an audience, and more particularly to apparatus of this kind adapted to give the visible picture or image a three-dimensional effect.

A variety of systems for giving perspective or relief effects in still or motion pictures have heretofore been proposed because of the ostensible market for a commercially feasible device of this kind, particularly in the motion picture field. However, to prove profitable in the latter industry, a product for carrying out these systems had to be devised which could be manufactured in substantial quantities by ordinary production methods without undue expense, and which embodied means for projecting three-dimensional pictures that would be visible as such to an audience comprising persons equipped with no special viewing apparatus, such as colored or polarized glasses. In addition, any successful stereoscopic projecting apparatus had to utilize as the source of the images being projected, photographs and films taken by established methods and existing apparatus. Most of the heretofore proposed systems, which were theoretically sound, have proven inadequate because they failed to meet these requirements. The proposed devices usually necessitated a great deal of expensive equipment, such as dual cameras, for taking the still or moving pictures which were to be thereafter rendered visible in perspective and/or required projecting equipment which had to be permanently installed in a hall or theater especially designed therefor. Furthermore, substantially all of the previously proposed devices used optical elements which were not available commercially and, in addition, said devices produced images visible only to a very limited audience which had to be accurately positioned relative to the image producing apparatus.

It is, therefore, an object of this invention to provide a novel apparatus for producing stereoscopic or three-dimensional images whereby the above-stated commercial requirements from a device of this kind are satisfied and the deficiencies of previously proposed systems and devices are obviated.

Another object is to provide novel apparatus adapted to utilize as a source of the image made visible in apparent perspective either films or photographs taken according to established photographic methods and by regular camera equipment.

A further object is to provide a stereoscopic device with novel light reflecting means.

A still further object is to provide a novel portable means adapted to contain apparatus for producing stereoscopic images and comprising means for readily mounting the elements of said apparatus in a predetermined operative relation to each other.

Still another object is to provide a novel screen apparatus adapted to make visible in relief or apparent perspective pictures projected by a standard projector utilizing, for example, standard 16 mm. or 8 mm. film.

A further object is to provide an apparatus of the above type which is portable and may be quickly and readily set up for use in a lecture hall or home.

The above and further objects and novel features of the invention will more fully appear from the following detailed description when the same is read in connection with the accompanying drawing. It is to be expressly understood, however, that the drawing is for the purpose of illustration only and is not intended to define the limits of the inventoin, reference for this latter purpose being had primarily to the appended claims.

In the drawing, wherein like reference characters refer to like parts throughout the several views, Fig. 1 is a perspective view with parts broken away and others shown diagrammatically of one embodiment of the present invention;

Fig. 2 is a diagrammatic view of the optical system and the arrangement of the image producing elements of the device shown in Fig. 1; and Fig. 3 is a view similar to Fig. 2 of another optical system and arrangement of parts for producing desired optical effects according to the present invention.

The embodiment of the invention illustrated, by way of example, in the drawing is adapted to give a perspective or relief effect to images originating in a planar surface as, for example, a motion picture film or a slide. The novel image forming means comprise a concave reflector 4 which is preferably specular, a screen 5 located in front and to one side of said reflector, and a proscenium 6 angularly disposed relative to said screen and said reflector, each of said elements being preferably perpendicular to a substantially horizontal plane. Screen 5 is preferably translucent so that images projected on either side thereof will be reflected by mirror 4 so as to be visible to an observer positioned in front of proscenium 6, the latter being suitably sized and so located that only the mirror and the reflection are visible to the observer. In order to produce an image on said screen, suitable projecting apparatus 7 is provided and, as shown in Fig. 2, said apparatus is adapted to form an image on the remote side of the screen relative to mirror 4.

To produce a three-dimensional or relief effect, the image projected on screen 5 is foreshortened laterally, i. e., in the direction of its width, and concave mirror 4 which is curved laterally and is angularly disposed to said screen and to the observer, compensates for this distortion and at the same time produces the parallax which gives the relief effect. To effect the desired foreshortening or distortion, lens means 8 are provided and suitably mounted in front of the lenses of projector 7, said means preferably comprising a pair of lenses 8a, 8b (Fig. 2) having a cylindrical curvature, lens 8a, for example, being plano-convex and lens 8b plano-concave in horizontal cross-section.

The surface of reflector 4 preferably has a parabolic curvature in horizontal cross-section, i. e., laterally, and substantially no curvature in vertical cross-section, i. e., longitudinally. It has been determined that this type of reflector is most efficient in producing for observers seated at different points relative to the proscenium images which are uniform in size and in three-dimensional effect. Furthermore, a parabolic reflector makes for a compact screen and proscenium arrangement and can be readily surfaced to the desired curvature. It is preferable to select for the mirror curvature that section of the parabola which has for its center P (Fig. 2) the point on the parabola of approximately 55° angularity relative to the parabolic axis, i. e., to the perpendicular drawn from the focus F to the directrix of the parabola. It has been found to be satisfactory to locate screen 5 with its center on line FP at a distance from reflector 4 slightly greater than half the length of said line. The screen is disposed relative to line FP at an angle slightly less than 90° in a direction to cause said screen to be more nearly parallel to reflector 4 and proscenium 6 is situated approximately parallel to the parabola directrix.

It is desirable to fabricate reflector 4 from a highly polished, thin, metal sheet 4a, and provide means for supporting said sheet in a given shape, said means as shown, comprising a backing member 4b, the latter preferably being formed of a light material, such as "balsa wood," and having the side to which said sheet is affixed conforming to the desired shape of the reflecting surface. It will be understood that suitably shaped and surfaced mirrors can also be obtained by various other methods as, for example, by spraying a metal coat on the side of a glass backing member having the requisite parabolic shape and then providing said metal coat with a high polish or by polishing and suitably shaping one side of a metal member adapted to be self-sustaining. It is to be noted that best results are obtained by utilizing a type of mirror that is adapted to have a reflector which is opaque and which constitutes the exterior surface of the reflecting unit so that substantially none of the light which is reflected passes through the reflector unit.

The above-described novel stereoscopic means are shown as part of a portable unit adapted to be set up in a home or lecture hall for utility with any standard projecting apparatus, but it is to be understood that the same means larger in size could be permanently located on the stage of a theater, for example, for producing three-dimensional images visible to the entire audience of said theater. The portable unit comprises a container 9 shaped like a Gladstone traveling bag having upper half 9a thereof adapted to receive reflector 4, the latter being permanently secured and positioned on the interior of said half and the lower half 9b constituting a chamber 10 for carrying the parts of the unit which are adapted to be dismantled when not in use. A relatively flat plate-like member 11 is hingedly secured to one of the upper edges of lower portion 9b and said member constitutes a cover for chamber 10 and a base plate for suitable mounts or supports 12 and 13 which are secured thereon in a predetermined relation to each other, said mounts being adapted to receive and fix screen 5 and proscenium 6, respectively, in the desired upright operative position. A plurality of props 14, as well as suitable means (not shown) in the rear walls of portions 9a and 9b for receiving the ends of said props, are provided for the purpose of maintaining portion 9a substantially at right angles to portion 9b. A suitable supporting mechanism comprising, for example, two pairs of intersecting legs 15 is also provided for holding the projecting unit in operative position with the lower portion 9b substantially horizontal and at a desired height above the ground, said legs being preferably hinged to the bottom wall of portion 9b and being adapted to be collapsed when not in use. If desired, each pair of legs 15 may be detachably secured to portion 9b, being carried in chamber 10 when detached. Bag 9 is preferably equipped with locking means 16 and a handle 17 whereby the same can be readily locked and carried.

In operation, bag 9 is opened and hinged portions 9a and 9b thereof are fixed relative to each other by props 14. Screen 5 and proscenium 6 are removed from chamber 10 and set in supports 12 and 13, respectively, and the audience is seated so that a substantial area of mirror 4 is visible to each member thereof. An image or picture is then projected on said screen and because of the spacial relationship of screen, mirror and proscenium, those viewing the mirror through said proscenium are able to see at least a substantial part of the picture as reflected from the screen and, as shown in Fig. 2, all of the persons seated between lines AB and MN are able to see the entire picture. The initial lateral distortion in the image is produced by lens means 8 and the correction therefor is effected by reflector 4 producing a concurrent three-dimensional or perspective effect.

Another embodiment of the present invention which dispenses with the requirement for lens means for the purpose of producing a laterally distorted image on screen 5 is shown diagrammatically in Fig. 3. This embodiment, which is particularly adapted for utility when the projector has been previously fixed in its usual relation to the audience, has projector 7 positioned almost centrally in front of proscenium 6 and the images projected thereby are reflected by mirror 4 and focused on screen 5, said images being laterally distorted by this first reflection. The audience is preferably located in front of or on both sides of said projector unit and this corresponds to the relation of the projector to the screen and the audience in lecture halls, for example, where a permanent location for the projector has been provided. The audience views the distorted image through mirror 4 and said image is visible without distortion because of the compensation affected by the second reflection which simultaneously produces a parallax effect that makes said image visible in apparent perspective. In the above-described embodiment, reflector 4, screen 5 and proscenium 6 are preferably fixed in the same relation to each other as in the embodiment illustrated in Figs. 1 and 2, and accordingly the same numerals have been used to designate said elements.

There is thus provided a novel apparatus for producing images visible to an audience as three-dimensional pictures, said images originating in standard films or slides and being projected by any of the well-known and commercially available projectors. Novel reflecting means having a parabolic curvature are used in said apparatus and the elements of the apparatus are adapted to be mounted and transported in novel means provided for this purpose.

Although only two embodiments of the invention have been illustrated and described, it is to be expressly understood that the same is not limited thereto. For example, it will now be apparent to those skilled in the art that the novel apparatus of the present invention could be utilized as an advertising still by substituting a laterally foreshortened photograph of the advertising copy in place of the screen. Various other changes may be made in the design and arrangement of the parts without departing from the spirit and scope of the invention. For a definition of the invention, reference will be had primarily to the appended claims.

What is claimed is:

1. In apparatus of the class described, a translucent screen, means for projecting a laterally foreshortened image on said screen from one side thereof, and a concave reflector on the other side of said screen for reflecting said image toward an observer, the surface of said reflector having the shape of a portion of a parabolic cylinder, said portion being on one side of the center of the parabola and having a mean slope of approximately 55° to the parabola axis.

2. In apparatus of the class described, a translucent screen, means for projecting a laterally foreshortened image on said screen from one side thereof, and a specular, concave reflector on the other side of said screen for reflecting said image toward an observer, the surface of said reflector having the shape of a portion of a parabolic cylinder, said portion being on one side of the center of the parabola and having a mean slope of approximately 55° to the parabola axis, said screen being located between the focal axis of said parabolic cylinder and the center of said reflecting surface.

3. In stereoscopic projecting apparatus including a reflector, a screen and a proscenium, a portable container for said elements comprising a pair of hinged members, said reflector being rigidly mounted in one of said members and said screen and proscenium fitting into the other of said members, a platform hingedly secured to the latter member and providing a cover therefor, means for holding said members substantially at right angles to each other with the reflector carrying member vertical and said platform horizontal, and mounts secured to said platform, said mounts being adapted to removably hold said screen and proscenium in operative relation to each other and to said reflector.

ANNING F. SURRÉ.